US011053776B1

(12) United States Patent
Cortez (10) Patent No.: US 11,053,776 B1
(45) Date of Patent: Jul. 6, 2021

(54) SUBSEA CHEMICAL INJECTION METERING VALVE COMMUNICATIONS MODULE AND SYSTEM FOR INJECTING CHEMICALS INTO A SUBSEA STRUCTURE

(71) Applicant: SMART SUBSEA, LLC, Houston, TX (US)

(72) Inventor: Mark Cortez, Houston, TX (US)

( * ) Notice: Subject to any disclaimer, the term of this patent is extended or adjusted under 35 U.S.C. 154(b) by 0 days.

(21) Appl. No.: 16/826,958

(22) Filed: Mar. 23, 2020

(51) Int. Cl.
*E21B 37/06* (2006.01)
*E21B 33/076* (2006.01)
*G05D 7/06* (2006.01)

(52) U.S. Cl.
CPC ............ *E21B 37/06* (2013.01); *G05D 7/0635* (2013.01)

(58) Field of Classification Search
CPC ...... E21B 37/06; E21B 33/076; G05D 7/0635
See application file for complete search history.

(56) References Cited

U.S. PATENT DOCUMENTS

| 6,745,838 | B2 | 6/2004 | Watson | |
| 7,234,524 | B2 * | 6/2007 | Shaw | E21B 41/02 166/304 |
| 9,187,980 | B2 * | 11/2015 | McHugh | E21B 33/076 |
| 9,255,465 | B2 | 2/2016 | Smith | |
| 9,309,750 | B2 * | 4/2016 | Coonrod | E21B 41/02 |
| 9,365,271 | B2 * | 6/2016 | Minnock | E21B 43/162 |
| 9,657,545 | B2 * | 5/2017 | Grace | E21B 33/076 |
| 9,695,665 | B2 * | 7/2017 | Older | E21B 33/076 |
| 9,915,129 | B2 * | 3/2018 | Newell | E21B 33/076 |
| 10,344,549 | B2 * | 7/2019 | Skeels | E21B 37/06 |
| 10,344,550 | B2 | 7/2019 | Skeels | |
| 10,689,959 | B2 * | 6/2020 | Simpson | E21B 47/07 |
| 2010/0126600 | A1 | 5/2010 | Watson | |
| 2018/0216982 | A1 * | 8/2018 | Slot, III | G01F 11/04 |

FOREIGN PATENT DOCUMENTS

| WO | 200037770 A1 | 6/2000 |
| WO | 2004016904 A1 | 2/2004 |

* cited by examiner

*Primary Examiner* — Matthew R Buck (57) ABSTRACT

A system for injecting chemicals into a subsea structure has a housing with an interior, a plurality of chemical injection metering valves positioned in the housing in which each of the plurality of chemical injection metering valves has an inlet and an outlet, a subsea connection plate connected to the inlet and the outlet of the plurality of chemical injection metering valves, an electrical system position in the housing so as to individually control the plurality of chemical injection metering valves, and a communication module positioned in the housing and cooperative with the electrical system so as to control an electrical signal passing through the electrical lines to the plurality of chemical injection metering valves.

20 Claims, 4 Drawing Sheets

SUBSEA CHEMICAL INJECTION METERING VALVE COMMUNICATIONS MODULE AND SYSTEM FOR INJECTING CHEMICALS INTO A SUBSEA STRUCTURE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to chemical injection metering valves. More particularly, the present invention relates to systems for controlling such chemical injection metering valves. More particularly, the present invention the relates to the connection of chemical injection metering valves to subsea structures.

2. Description of Related Art Including Information Disclosed Under 37 CFR 1.97 and 37 CFR 1.98

The production of hydrocarbons from subsea oil and gas wells typically involves positioning several items of production equipment, such as Christmas trees, manifolds, pipelines, flowline skids, and pipeline end terminations on the sea floor. Flowlines or jumpers are typically coupled to these various items of equipment so as to allow the produced hydrocarbons to flow between and among such production equipment. The ultimate object is to get the produced hydrocarbons to a desired end-point, such as a surface vessel, a pipeline, or an on-shore storage facility. Jumpers may be used to connect the individual wellheads to a central manifold. In other cases, relatively flexible lines may be employed to connect some of the subsea component items to one another.

One challenge facing offshore oil and gas operations involves ensuring that the flowlines of fluid flow paths within the subsea equipment remain open so that production fluid may continue to be produced. The produced hydrocarbon fluids will typically comprise a mixture of crude oil, water, light hydrocarbon gases, and other gases such as hydrogen sulfide and carbon dioxide. In some cases, solid materials or debris, such as sand, small rocks, pipe scale or rust may be mixed with the production fluid as it leaves the well. The same challenge applies to other subsea flowlines and flow of fluid flow paths used for activities related to the production of hydrocarbons. These other flowlines and flow paths can be used to service the subsea production systems, to inject water, gas, or other mixtures of fluids in the subsea wells, or to transport other fluids.

One problem that is sometimes encountered in the production of hydrocarbons from subsea wells is that a blockage may form in a subsea flow line or in a piece of subsea equipment. In some cases, the blockage can completely block the flow line or the equipment while in other cases, the blockage may only partially block the flow line or the equipment. For example, the solid materials entrained in the produced fluids may be deposited during temporary production shutdowns. The entrained debris may settle so as to form all or part of a blockage and flow line or other item of production equipment. Another problem that may be encountered is the formation of hydrate blockages in the flowlines in the production equipment.

In general, hydrates may form under appropriate high pressure and low temperature conditions. Subsea oil and gas wells are often located at water depths greater than a few hundred feet and located in cold-weather environments. The surrounding water may only be a few degrees above freezing. Although the produced hydrocarbons are relatively hot as they leave the wellhead, as it flows to the subsea production equipment and flowlines, the surrounding water will cool the produced fluid. The produced hydrocarbon fluids will cool rapidly when the flow is interrupted for any length of time. If the production fluid is allowed to cool below the hydrate formation temperature for the production fluid and the pressure is above the hydrate formation pressure for the production fluid, hydrates may formed in the produced fluid which, in turn, may ultimately form of blockage that can block the production fluid flow paths through the production flowlines or production flow equipment.

A variety of chemicals (often referred to as "additives") are often introduced into producing wells, wellsite hydrocarbon processing units, oil and gas pipelines and chemical processing units in order to control, among other things, corrosion, scale, paraffin, emulsion, hydrates, asphaltenes and formation of other harmful chemicals. In oilfield production wells, chemicals are usually injected through a tubing that is run from the surface to a known depth. Chemicals are introduced in connection with electrical submersible pumps or through auxiliary tubing associated with a power cable used with an electrical submersible pump.

For oil well applications, a high-pressure pump is typically used to inject a chemical into the well from a source thereof at the well site. The pump is usually set to operate continuously at a set speed or struggling to control the amount of injected chemical. A separate pump and an injector are typically used for each type of chemical. Manifolds are sometimes used to inject chemicals into multiple wells.

Commercially-used well site chemical injection apparatus usually requires periodic manual inspection to determine whether the chemicals are being dispensed correctly. It is important and economically beneficial to have chemical injection systems which can supply precise amounts of chemicals which systems are adapted to periodically or continuously monitor the actual amount of treatment chemicals being dispensed, determine the impact of the dispense chemicals, vary the amount of the dispensed chemicals as needed to maintain certain desired parameters of interest within their respective desired ranges are at their desired values, communicate necessary information with offsite locations and take action based in response to commands received from such offsite locations.

Traditionally, subsea chemical injection meter valves have been installed in the oil well subsea trees. These systems have also traditionally use subsea control modules located on the subsea tree as a communication path. This creates two problems for oil operators. One problem is that because of the leadtime on subsea trees, the decision to incorporate chemical injection metering valves has to be made extremely early in the process of developing a subsea field. The second problem is that is required interface the chemical injection metering valves with the control system and the subsea control module chosen by the operator or tree manufacturer.

In the past, various patents have issued with respect to such subsea chemical injection valves. For example, U.S. Pat. No. 6,745,838, issued on Jun. 8, 2004 to R. R. Watson, describes a chemical injection system for controlling the distribution of chemical fluid from a supply conduit to an individual petroleum well at an adjustable rate. The system includes a remotely-operated two position control valve connected to the supply conduit, a cylinder having a cylindrical bore with a first input/output port, and a second input-output port. The fluid barriers provided within the cylindrical bore such that the chemical fluid flows from the supply conduit through the control valve end of the cylinder bore enforces the barrier to displace a fixed volume of fluid. Each operation of the directional control valve reverses the travel direction of the barrier within the cylindrical bore and injects another fixed quantity of fluid into the well.

U.S. Pat. No. 9,187,980, issued on Nov. 17, 2015 to McHugh et al., describes an apparatus that includes a chemical injection management system. The chemical injection management system includes a flow path having an inlet and an outlet. A pump is disposed in the flow path between the inlet and the outlet. The pump is configured to increase the pressure of a fluid flow through the flow path.

U.S. Pat. No. 9,255,465, issued on Feb. 9, 2016 to Smith I V et al., shows a control program for a positive displacement metering system that measures the time required for the travel of a free piston in a cylinder of a known volume in order to determine an average flow rate during a full stroke of the piston. The system also measures and records the inlet and outlet pressures or the differential pressure between the fluid inlet and outlet. The control program positions a four-way valve which may function as an adjustable metering orifice in response to the measured average flow rate and/or changes in the inlet and outlet pressures was to achieve the desired flow rate. At the end of each stroke, the four-way valve is repositioned to reverse fluid flow through the metering cylinder.

U.S. Pat. No. 9,365,271, issued on Jun. 14, 2016 to Minnock et al., describes a fluid injection system configured to removably coupled to a mineral extraction system. The fluid injection system includes a fluid injection system controller, and a flow meter system coupled to the fluid injection system controller. The flow meter system is configured to measure a fluid flow of fluid through the fluid injection system. An adjustable valve is configured to control the fluid flow through the fluid injection system. A non-return valve blocks reverse flow of the fluid through the fluid injection system such that the fluid injection system controller, the flow meter system, the adjustable valve, and the non-return valve are coupled to a common housing.

U.S. Pat. No. 9,657,545, issued on May 23, 2017 to Grace et al., teaches an apparatus that includes a chemical injection management system. The chemical injection management system includes a tree interface to couple the chemical injection management system to a tree and a positive displacement flow meter. In particular, the chemical injection management system has a housing, a first interface coupled to the housing, a chemical injection control assembly disposed within the interior of the housing, a protective fluid disposed in the interior of the housing, and a pressure equalizer coupled to the housing. The chemical injection control assembly is configured to control a parameter of fluid flow through a fluid path.

U.S. Pat. No. 10,344,550, issued on Jul. 9, 2019 to H. B. Skeels, shows a system for reversing fluid flow to and from a single-direction fluid flow device. This flow reversal system has a single direction flow device adapted to receive a fluid and first, second, third and fourth binary valves. The system is adapted to be configured in a first position wherein the first and fourth binary valves are open and the second and third binary valves are closed such that the fluid flows through the single direction flow device in a first direction. The system is configured to move from a first position to a neutral position by actuating the second and third binary valves from the closed position to an open position. In the neutral position, the first, second, third and fourth binary valves are open and the fluid flows through the single direction flow device in the first direction. The system is configured to move from the neutral position to a second position by actuating the first and fourth binary valves from an open position to a closed position in which the first and fourth binary valves are closed and the second and third binary valves are open.

U.S. Patent Application Publication No. 2010/0126600, published on May 27, 2010 to R. R. Watson, provides a metering body for a chemical injection system that comprises a free piston having a pair of mechanically-actuated poppet valves which may individually open to permit fluid to pass from one side of the free piston to the other. The free piston slides within a cylinder having cylinder heads at opposite ends. Input/output ports are provided in the cylinder heads. The puppet valves have actuators that extend beyond the opening faces of the free piston.

International Publication No. WO 2004/016904, published on Feb. 26, 2004 to Shaw et al., discloses a chemical injection unit for additive injection. The system monitors and controls the injection of additives into formation fluids recovered to a subsea well. The system includes a chemical injection unit and a controller positioned at a remote subsea location. Injection unit uses a pump to supply one or more selected additives from a subsea and/or remote supply unit. These controller operates the pump to control the additive flow rate based on signals provided by sensors measuring a parameter of interest.

International Publication No. WO 00/37770, published on Jun. 29, 2000 to K. T. Kohl, teaches a closed loop chemical injection and monitoring system for oilfield operation. The system monitors the well site injection of additives into formation fluids recovered through wellbores and controls the supply of such additives from remote locations. A pump supplies the selected additive from a source at the well site into the wellbore the a suitable supply line. A flow meter in the supply line measures the flow rate of the additive through the supply line and generate signals representative of the flow rate. A controller at the well site determines the flow rate from the flowmeter signals in response thereto controls the pump to control the flow rate of the additive to the well. The well site controller interfaces with a suitable two-way communication link and transmit signals and data representative of the flow rate and other parameters to a second remote controller. The remote controller transmits command signals to the well site controller representative of any change desired for the flow rate. The well site controller is microprocessor-based and may be programmed at the well site or by the remote controller to adjust the flow rate.

It is an object of the present invention to provide a system that allows an operator to remove the chemical injection metering valve from the subsea structure.

It another object the present invention to provide a system that defers the cost of adding the chemical injection metering valve until it is determined that it is absolutely necessary.

It is another object the present invention provide a system that allows communications directly topsides.

It is another object of the present invention to provide a system that avoids passing communications through a subsea control module and reduces the cost associated therewith.

It is another object of the present invention to provide a system that can be added to existing subsea fields that do not already incorporate chemical injection metering valves.

It is another object of the present invention to provide a system that avoids the need to interface the chemical injection metering valves with the control system and the subsea control module chosen by operators or tree manufacturers.

It is another object of the present invention provide a system that reduces the cost of the amount of chemicals injected.

It is another object of the present invention provide a system that allows the chemical injection metering valves and the communications equipment to be easily packaged and deployed.

These and other objects and advantages of the present invention will become apparent from a reading of the attached specification and appended claims.

BRIEF SUMMARY OF THE INVENTION

The present invention is a system for injecting chemicals into the subsea structure. The system has a housing with an interior, a plurality of chemical injection metering valves positioned in the housing, a subsea connection plate connected to the housing into the inlets and outlets of the plurality of chemical injection metering valves, and an electrical system positioned in the housing. The subsea connection plate is adapted to allow a plurality of conduits to be connected thereto so that a chemical passing from the outlet of the plurality of chemical injection metering valves flows to the subsea structure. The electrical system has a connector adapted to connect to an electrical source. The electrical system has a splitter that extends electrical lines to the plurality of chemical injection metering valves. Each of the plurality of chemical injection metering valves is individually controlled by the electrical system.

A communications module is positioned in the housing. The communications module is cooperative with the electrical lines of the electrical system. The communications module is adapted to control an electrical signal passing through the electrical lines to the plurality of chemical injection metering valves.

The electrical system has a cable extending from the connector to the splitter. The communication module is positioned along the cable. The cable of the electrical system has a pressure-balanced hose. The pressure-balance hose has a first bladder on one side of the communications module and a second bladder on an opposite side of the communications module. The first and second bladders are cooperative at the pressure-balance hose so as to balance pressure in the pressure-balance hose.

The housing has a pin member extending downwardly from the bottom of the housing. This pin member is adapted to engage with the socket of a mud mat. The pin member has an inverted truncated conical or pyramidal configuration. The housing has an electrical bulkhead at the surface of the housing. The electrical bulk head is adapted to connect to the electrical source.

The communications module is connected to a fiber-optic or electrical line. The fiber-optic or electrical line is adapted to pass a control signal to the communications module. In one embodiment, the fiber-optic or electrical line is connected to a top side control system. In another embodiment, the fiber-optic or electrical line is connected to a subsea control module.

The present invention is also a subsea chemical injection system that comprises a subsea structure, a chemical injection metering valve communications module, an umbilical connected by an electrical line extending to an umbilical termination head in which the umbilical termination head is connected to the chemical injection metering valve communications module by flying lead, and an electrical distribution unit connected by another flying lead to the umbilical termination head. The chemical injection metering valve communication module has a housing with an interior, a plurality of chemical injection metering valves positioned in the housing, a subsea connection plate connected to the inlet and to the outlet of the plurality of chemical injection metering valves, an electrical system position in the housing and having a splitter that extends electrical lines to the plurality of chemical injection metering valves, and a communication module position in the housing and cooperative with the electrical lines of the electrical system so as to control an electrical signal passing through the electrical lines to the plurality of chemical injection metering valves. The subsea connection plate is adapted to allow a plurality of conduits to be connected thereto so that the chemical passes through the outlet of the plurality of chemical injection metering valves so as to flow to the subsea structure. The electrical system has a connector adapted to connect to an electrical source. The umbilical termination head is connected to the chemical injection metering valve communications module by a flying lead. The electrical distribution unit is connected by another flying lead to the umbilical termination head. The electrical distribution unit is connected to the chemical injection metering valve communications module by still another flying lead.

The subsea chemical injection system of the present invention has a cable extending from the connector to the splitter. The communication module is positioned along this cable. In particular, this cable of the electrical system has a pressure-balance hose. The pressure-balance hose has a first bladder on one side of the communications module and a second bladder on an opposite side of the communications module. The first and second bladders are cooperative with the pressure-balance hose so as to balance pressure in the pressure-balance hose.

In one embodiment of the present invention, the subsea structure is a plurality of chemical injection inlets. The outlets of the plurality of chemical injection metering valves are cooperative individually with the plurality of chemical injection inlets of the subsea structure. In another embodiment, the subsea structure is a plurality of subsea structures in which each of the plurality of subsea structures has a chemical injection inlet. The outlets of the plurality of chemical injection metering valves are cooperative individually with the chemical injection inlet of the plurality of subsea structures.

In one embodiment, the electrical distribution unit has an optical fiber on the still another flying lead. The optical fiber is connected to the communications module. The subsea connection plate has the outlets thereof connected by steel flying leads to the subsea structure. A hydraulic line is carried by the umbilical. This hydraulic line is connected the inlets of the plurality of chemical injection metering valves and adapted to pass a chemical to each of the plurality of chemical injection metering valves. The subsea connection plate has a hydraulic connector thereon. The flying lead from the umbilical termination head connects the hydraulic line to the hydraulic inlet. The hydraulic inlet has a conduit extending therefrom into the interior of the housing. The conduit has a portion extending to the inlets of the plurality of chemical injection metering valves.

In the present invention, the subsea structure can be a subsea Christmas tree, a wellhead, a manifold, or flowlines.

This foregoing Section is intended to describe, with specificity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
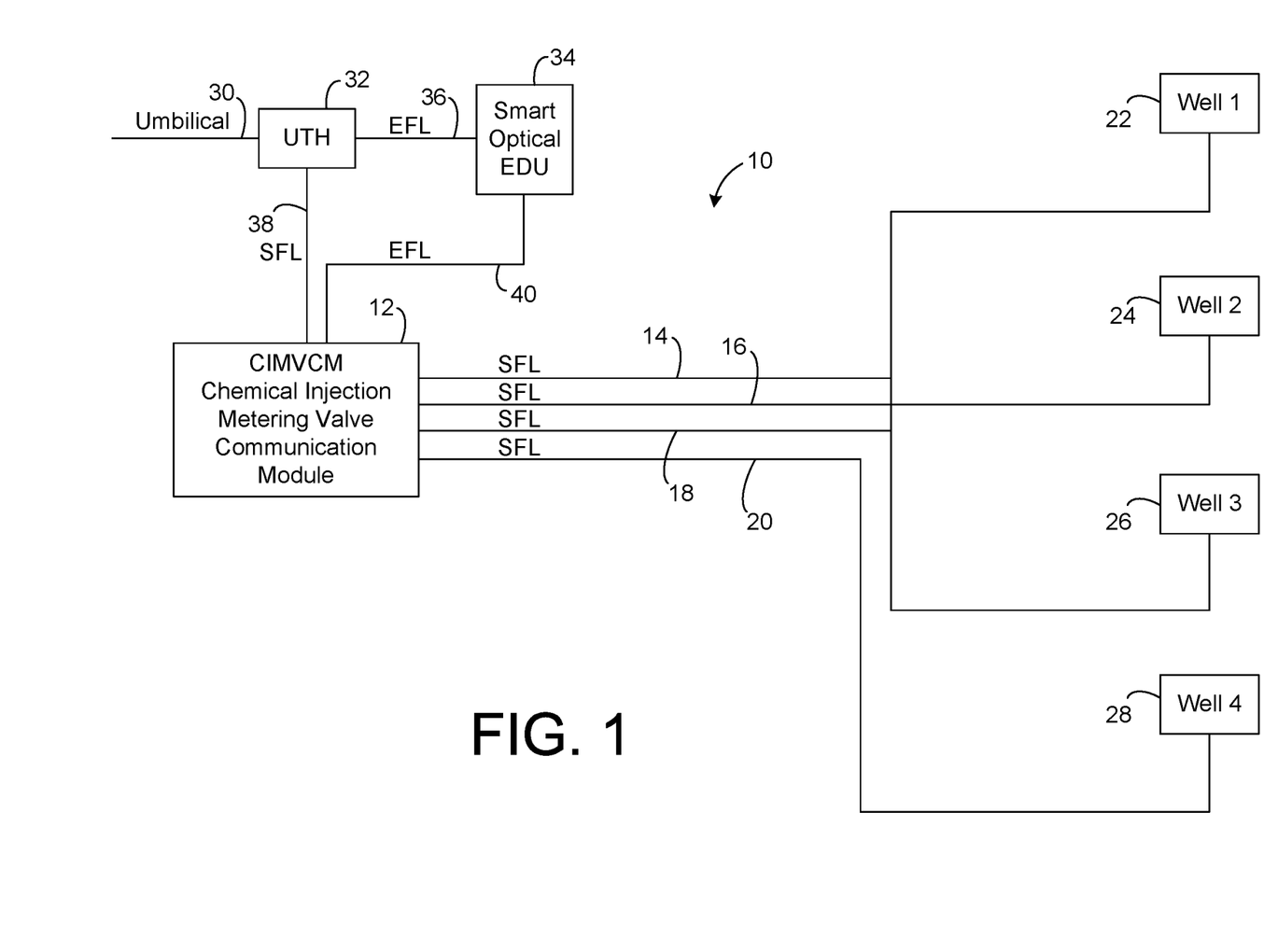
FIG. 1 is a schematic representation of the chemical injection metering valve communication system of the present invention.

FIG. 1 shows a schematic view of the chemical injection metering valve system 10 of the present invention. This chemical injection metering valve system 10 includes a chemical injection metering valve communications module 12 that is connected by lines 14, 16, 18 and 20 to respective wells 22, 24, 26 and 28. In particular, the lines 14, 16, 18 and 20 are steel flying leads that extend from a subsea junction plate of the chemical injection metering valve communications module 12. An umbilical 30 is illustrated as connected to the umbilical termination head 32. The umbilical 30 will carry the electricity from an electrical source and will carry a fluid to the umbilical termination head 32. The electrical line in umbilical 32 will extend to a smart optical electrical distribution unit 34 by way of an electrical flying lead 36. The fluid from the umbilical 32 will flow to the chemical injection metering valve communications module 12 by a steel flying lead 38 from the umbilical termination head 32. The smart optical electrical distribution unit 34 is connected by electrical flying lead 40 to the chemical injection metering valve communications module 12. The smart optical electrical distribution unit 34 can send electrical power, and electrical/fiber optic control signals to the chemical injection metering valve communications module 12.

As will be described hereinafter, the subsea chemical injection metering valve system 10 of the present invention is a subsea structure that contains the hydraulic, electrical and communication devices that allow integration into new and existing subsea oil fields. The subsea chemical injection metering valve system of the present invention has four main components. These are the chemical injection metering valves, the hydraulic components, the electrical components and the communication components. The hydraulic components will include hydraulic couplers, a subsea connection plate and hydraulic tubing. These components will be interfaced with the chemical injection metering valves so as to allow access to the chemical injection metering valve hydraulically. Any number of chemical injection metering valves can be interfaced. The electrical components include subsea electrical connectors, wet mates, dry mates or other, and interface cabling and a hose. The components can be interfaced together so as to allow access to the chemical injection metering valves electrically. The communication part of the system may or may not be needed. Access can be given directly to the chemical injection metering valve communication electronics or through a communications module. The communications module will interface directly with the chemical injection metering valves and allow any communication protocol to be used to talk with the chemical injection metering valves. The communication path can come from any source, such as a topsides control system of other the subsea devices, such as a subsea control module.

The subsea chemical injection metering valve system of the present invention eliminates the problems of the prior art. The module 10 of the present invention allows the operator to remove the chemical injection metering valves from the tree and to defer the cost of adding chemical injection metering valves until it is determined that they are absolutely necessary. This module allows communications directly topsides and avoids the passing of this information through the subsea control module (which can be costly). The system also allows communication through this subsea control module, if necessary. Another advantage of the system is the ability of it to be added to existing subsea fields that do not already incorporate chemical injection metering valves.

Figure 2:
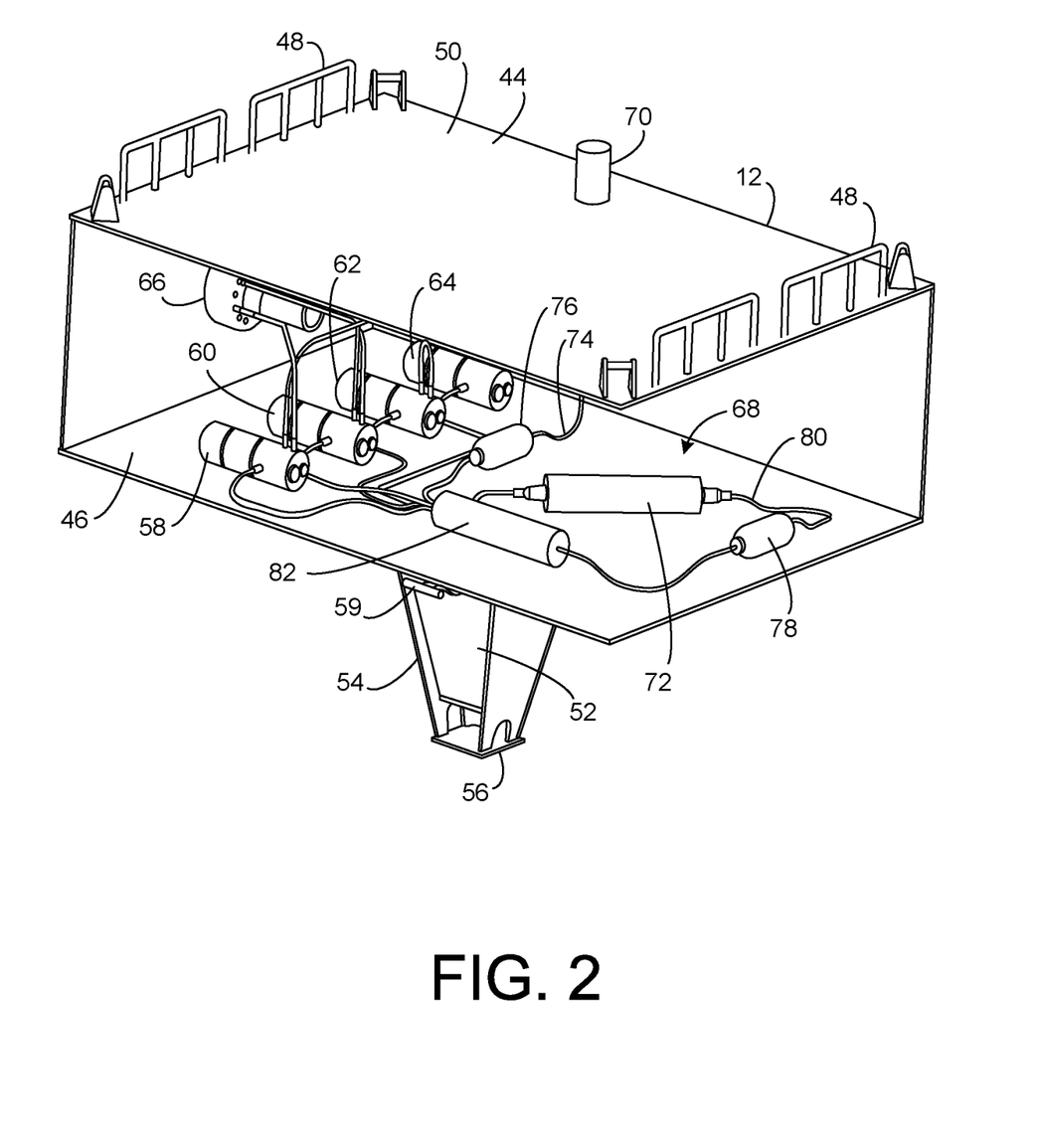
FIG. 2 is an upper perspective and transparent view of the chemical injection metering valves communications system of the present invention.

FIG. 2 shows the details of the chemical injection metering valve communications module 10 of the present invention. Module 10 has a housing 44 with an interior 46. It can be seen that there are a plurality of lift eyes 48 extending upwardly from the top surface 50 of the housing 44. Housing 44 has a pin member 52 extending downwardly therefrom. Pin member 52 is adapted to be engaged within a receptacle 54 of a mud mat 56 located at the subsea floor. A suitable locking pin 59 can be installed so as to affix the pin member 52 within the receptacle 54 so that the housing 44 is stable at the subsea floor. The pin member 52 will have an inverted truncated conical or pyramidal configuration.

A plurality of chemical injection metering valves 58, 60, 62 and 64 are located within the interior 46 of the housing 44. As will be described hereinafter, each of the plurality of chemical injection metering valves 58, 60, 62 and 64 has an inlet and an outlet. A subsea connection plate 66 is connected to the inlet and to the outlet of the plurality of chemical injection metering valves 58, 60, 62 and 64. The subsea connection plate 66 is adapted to allow a plurality of conduits to be connected thereto so that the chemical passing from the outlet of the plurality of chemical injection metering valves 58, 60, 62 and 64 serves to flow to the subsea structures, such as wells 22, 24, 26 and 28 (shown in FIG. 1). In particular, the subsea structure can be in the nature of a Christmas tree, a wellhead, a manifold, or flowlines. An electrical system 68 is positioned in the interior 46 of the housing 44. The electrical system 68 includes an electrical bulkhead 70 that is formed on the top surface 50 of the housing 44 and allows a connection to the electrical system 68 within the interior 46 of the housing 44. The electrical system 68 includes a communications can 72 that is connected by a cable 74 to the electrical bulkhead 70. A first bladder 76 and a second bladder 78 are positioned at opposite ends of the communications can 72 in the interior 46 of the housing 44. Bladders 76 and 78 serve to pressure balance the hose 80 that extends to and through the communications can 72. The pressure-balanced hose 80 will contain the electrical lines passing to and from the communications can 72. A splitter 82 connects to the cable 74. Splitter 82 will pass the electrical signals therefrom along lines connected to the chemical injection metering valves 58, 60, 62 and 64. As such, control signals from the electrical distribution unit 34 and from the top side controls can be passed individually to each of the chemical injection metering valves 58, 60, 62 and 64. These electrical signals control the flow of chemicals through such valves and outwardly therefrom by way of the subsea connection plate 66.

Figure 3:
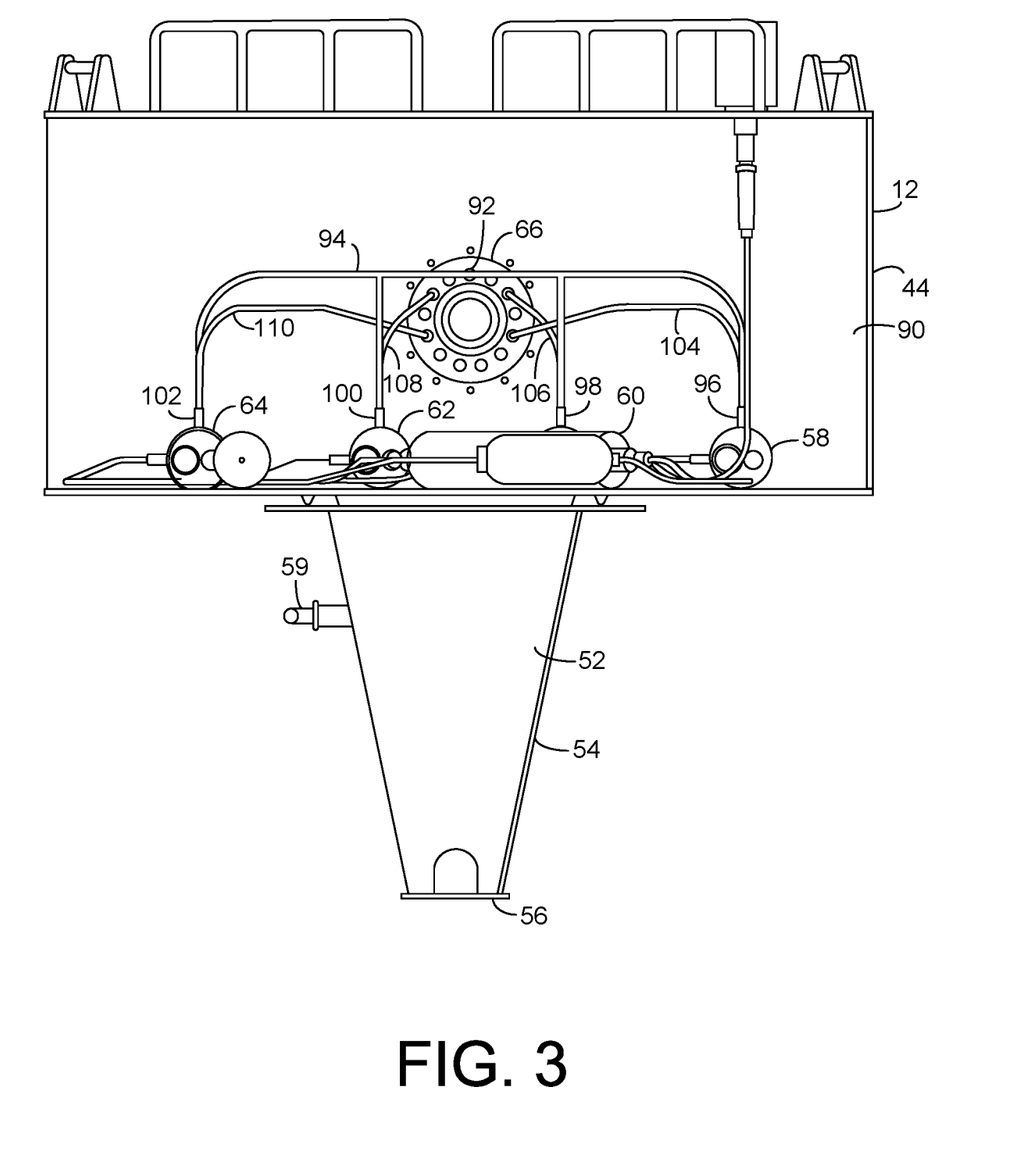
FIG. 3 is a side elevational and transparent view of the subsea chemical injection metering valve communications system of the present invention.

FIG. 3 is a further view of the chemical injection metering valve communications module 12. FIG. 3, in particular, illustrates the subsea connection plate 66. The connection plate is affixed to the end 90 of the housing 44. The connection plate 66 allows another connection plate to be joined thereto by the use of a remotely-operated vehicle (ROV).

In FIG. 3, the chemical injection metering valves 58, 60, 62 and 64 are particularly illustrated. In particular, the subsea connection plate 66 has an inlet 92 that is connected to a conduit 94. Conduit 94 is directed to the respective inlets 96, 98, 100 and 102 of the respective chemical injection metering valves 58, 60, 62 and 64. As such, inlet 92 can supply the chemical to the inlets 96, 98, 100 and 102 which is transmitted by the steel flying lead 38 from the umbilical termination head 32 in the umbilical 30.

The subsea connection plate 66 has various outlets formed thereon. These outlets are connected to the outlet lines 104, 106, 108 and 110 from the respective chemical injection metering valves 58, 60, 62 and 64. As such, the chemical passing through the outlet lines 104, 106, 108 and 110 will flow through the respective outlets in the subsea connection plate 66 and ultimately through the lines 14, 16, 18 and 20 leading to the subsea structures 22, 24, 26 and 28 (as shown in FIG. 1).

FIG. 3 further shows the configuration of the pin member 52 in relation to the receptacle 54. The locking pin 59 is engaged through a wall of the receptacle 54 and through a wall in the pin member 52 so as to lock the housing 44 in position upon the subsea mud mat 56.

Figure 4:
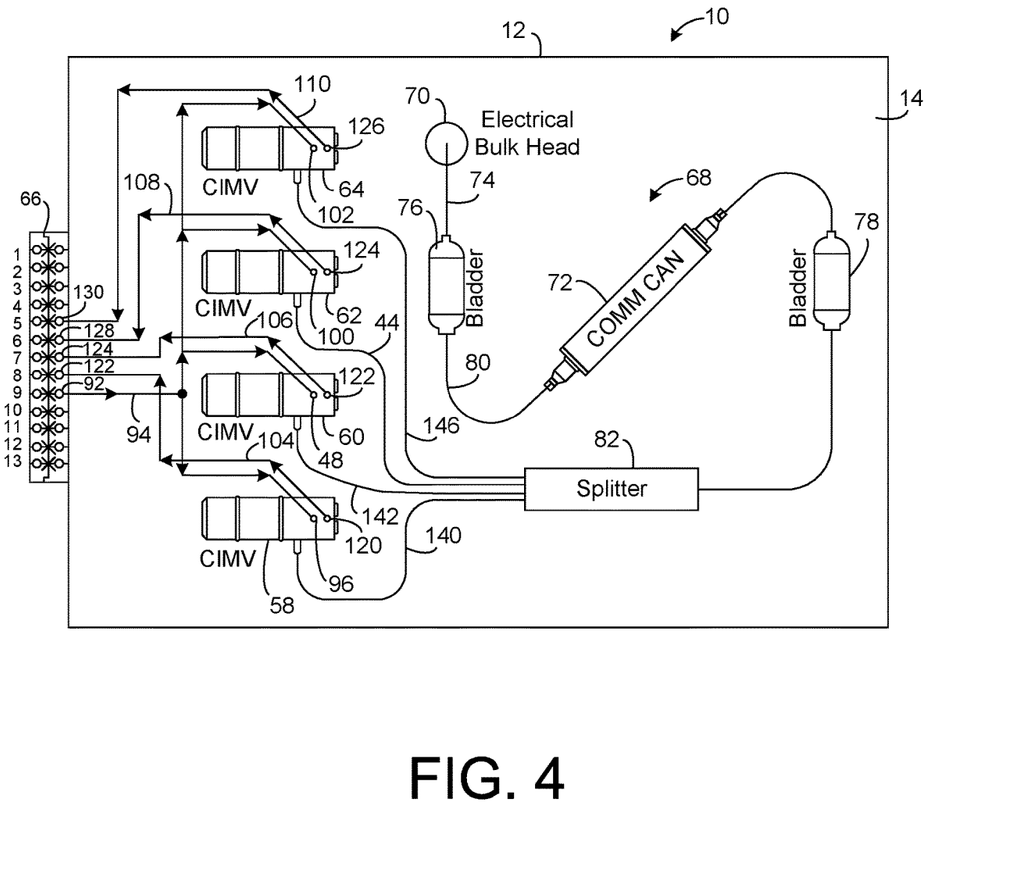
FIG. 4 is a diagrammatic illustration of the subsea chemical injection metering valve system of the present invention.

FIG. 4 is a diagrammatic illustration of the operation of the subsea chemical injection system 10 of the present invention. In particular, FIG. 4 shows the housing 12 as having an interior 14. Initially, the housing 14 has chemical injection metering valves 58, 60, 62 and 64 positioned in the interior thereof. Chemical injection metering valves 58, 60, 62 and 64 serve to dispense a chemical to various chemical inlets of a single subsea structure or to chemical inlets in a variety of subsea structures or multiple subsea structures of the same type. Ultimately, there is a subsea junction plate 66 that has a plurality of orifices formed therein. A suitable flying junction plate can be joined to the subsea junction plate 66 so as to allow fluid communication to occur therethrough. The inlet orifice 92 passes along conduit 94 so that portions connect to the inlets 96, 98, 100 and 102 of the respective chemical injection metering valves 58, 60, 62 and 64. Outlet line 104 will extend from the outlet 120 of chemical injection metering valve 58 to an outlet orifice 122. Similarly, outlet line 106 extends from the outlet 122 to the outlet orifice 124 of the subsea junction plate 66. Outlet line 108 extends from the outlet 124 of the chemical injection metering valves 62 to the outlet orifice 128. Finally, outlet line 110 extends from outlet 126 of the chemical injection metering valve 64 to the outlet orifice 130. It will be appreciated that, in the present invention, a larger or smaller number of chemical injection metering valves can be included within the system 10. If more chemical injection metering valves are required, and these can be connected to the additional orifices present on the junction plate 66. As such, the system 10 is easily adaptable to the number of chemical inlets of the various subsea structures. Ultimately, control of the chemical injection metering valves 58, 60, 62 and 64 is achieved by the electrical system 68 of the present invention. In particular, the electrical bulkhead 70 allows electrical connection between the electrical flying lead 40 (shown in FIG. 1) with the electrical distribution unit 34. The cable 74 is electrically connected to the electrical bulkhead 70 and extends outwardly therefrom through the first bladder 76, through the communications can 72, through the second bladder 78 and to the splitter 82. As such, the cable 74 includes a hose 80 that is pressure balanced by the bladders 76 and 78.

The communications can 72, if necessary, can act to control the electrical signals passing from the electrical bulkhead 72 each of the chemical injection metering valves 58, 60, 62 and 64. The communications can 72 can be suitably controlled by the electrical lines or fiber-optics extending from the smart optical electrical distribution unit 34. If necessary, the communication can 72 can multiplex the electrical signals so as to adapt electrical signals for the various chemical injection metering valves. If not necessary, the communication can 72 can be eliminated such that the electrical signals passing from the electrical distribution unit 34 directly control the operation of the various chemical injection metering valves.

In FIG. 4, it can be seen that the splitter 72 provides electrical signal into separate lines 140, 142, 144 and 146. Line 140 will send electrical control signals to the chemical injection metering valve 58. Line 142 sends electrical control signals to the chemical injection metering valve 60. Line 144 sends electrical signals to control the operation of the chemical injection metering valves set 62. Finally, line 146 sends electrical signals for the control of the chemical injection metering valve 64. As such, the system of the present invention is adapted to control the amount of chemical released by each of the metering valves, to control the rate at which the chemical is released, to control the duration of the flow of chemicals through the such metering valves, and to ultimately control the volume of fluid that is dispensed to the subsea structure.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A system for injecting chemicals into a subsea structure, the system comprising:

a housing having an interior;

a plurality of chemical injection metering valves positioned in said housing, each of said plurality of chemical injection metering valves having an inlet and an outlet;

a subsea connection plate affixed to said housing and connected to the inlet and to the outlet of said plurality of chemical injection metering valves, said subsea connection plate adapted to allow plurality of conduits to be connected thereto so that a chemical passing from the outlet of said plurality of chemical injection metering valves flows to the subsea structure; and an electrical system positioned in said housing, said electrical system having a connector adapted to connect to an electrical source, said electrical system having a splitter that extends electrical lines to said plurality of chemical injection metering valves, each of said plurality of chemical injection metering valves being individually controlled by said electrical system.

2. The system of claim 1, further comprising:
a communications module positioned in said housing, said communications module cooperative with the electrical lines of said electrical system, said communications module adapted to control an electrical signal passing through the electrical lines to said plurality of chemical injection metering valves.

3. The system of claim 2, said electrical system having a cable extending from said connector to the splitter, said communications module positioned along said cable.

4. The system of claim 3, the cable of said electrical system having a pressure-balance hose, the pressure-balance hose having a first bladder on one side of said communications module and a second bladder on an opposite side of said communications module, the first and second bladders being cooperative with the pressure-balance hose so as to balance pressure in the pressure-balance hose.

5. The system of claim 1, said housing having a pin member extending downwardly from the bottom of said housing, said pin member adapted to engage with a socket of a mud mat.

6. The system of claim 5, said pin member having an inverted truncated conical or pyramidal configuration.

7. The system of claim 1, said housing having an electrical bulkhead at a surface of said housing, said electrical bulkhead adapted to connect to the electrical source.

8. The system of claim 2, said communications module connected to a fiber-optic or electric line, the fiber-optic or electric line adapted to pass control signals to said communications module.

9. The system of claim 8, the fiber-optic or electrical line be connected to a top side control system.

10. The system of claim 8, the fiber-optic or electrical line being connected to a subsea control module.

11. A subsea chemical injection system comprising:
a subsea structure;
a chemical injection metering valve communication module comprising:
  a housing having an interior;
  a plurality of chemical injection metering valves positioned in said housing, each of said plurality of chemical injection metering valves having an inlet and an outlet;
  a subsea connection plate connected to said housing and to the inlet and to the outlet of said plurality of chemical injection metering valves, said subsea connection plate being connected to said subsea structure so that a plurality of conduits extend between the plurality of chemical injection metering valves to the subsea structure such that a chemical passes from the outlet of the plurality of chemical injection metering valves and flows to the subsea structure;
  an electrical system positioned in said housing, said electrical system having a connector adapted to connect to an electrical source, said electrical system having a splitter that extends electrical lines to said plurality of chemical injection metering valves, each of said plurality of chemical injection metering valves being individually controlled by said electrical system; and
  a communication module positioned in said housing, said communication module cooperative with the electrical lines of said electrical system, said communication module adapted to control an electrical signal passing through the electrical lines to said plurality of chemical injection metering valve;
an umbilical head vein and electrical line extending to an umbilical termination head, said umbilical termination head being connected to said chemical injection metering valve communication module by a flying lead; and
electrical distribution unit connected by another flying lead to the umbilical termination head, said electrical distribution unit being connected to said chemical injection metering valve communication module by still another flying lead.

12. The subsea chemical injection system of claim 11, said electrical system having a cable extending from said connector to the splitter, said communication module positioned along the cable.

13. The subsea chemical injection system of claim 12, the cable of said electrical system having a pressure-balance hose, the pressure-balance hose to having a first bladder on one side of said communications module and a second bladder at an opposite side of said communications module, the first and second bladders being cooperative with the pressure-balance hose so as to balance pressure in the pressure-balance hose.

14. The subsea chemical injection system of claim 11, said subsea structure having a plurality of chemical injection inlets, the outlets of said plurality of chemical injection metering valves being cooperative individually with the plurality of chemical injection inlets of the subsea structure.

15. The subsea chemical injection system of claim 11, said subsea structure comprising a plurality of subsea structures, each of the plurality of subsea structures having a chemical injection inlet, the outlets of said plurality of chemical injection metering valves being cooperative individually with the chemical injection inlet of the plurality of subsea structures.

16. The subsea chemical injection system of claim 11, said electrical distribution unit having an optical fiber on the still another flying lead, the optical fiber being connected to said communications module.

17. The subsea chemical injection system of claim 11, said subsea connection plate having the outlets thereof connected by steel flying leads to the subsea structure.

18. The subsea chemical injection system of claim 11, further comprising:
a hydraulic line carried by said umbilical, said hydraulic line connected to the inlets of said plurality of chemical injection metering valves and adapted to pass a chemical to each of said plurality of chemical injection metering valves.

19. The subsea chemical injection system of claim 18, said subsea connection plate having a hydraulic inlet connector thereon, the flying lead from the umbilical termination head connecting to the hydraulic inlet, the hydraulic inlet having a conduit extending therefrom into the interior of said housing, the conduit having a portion extending to the inlets of said plurality of chemical injection metering valves.

20. The subsea chemical injection system of claim 11, the subsea structure selected from the group consisting of subsea Christmas trees, manifolds and pipelines.

\* \* \* \* \*